Sept. 19, 1967
W. M. ADAMS
3,342,718
APPARATUS FOR THE RECOVERY OF SILVER FROM USED
PHOTOGRAPHIC FIXING SOLUTIONS
BY ELECTROLYSIS
Filed Jan. 21, 1964
3 Sheets-Sheet 1
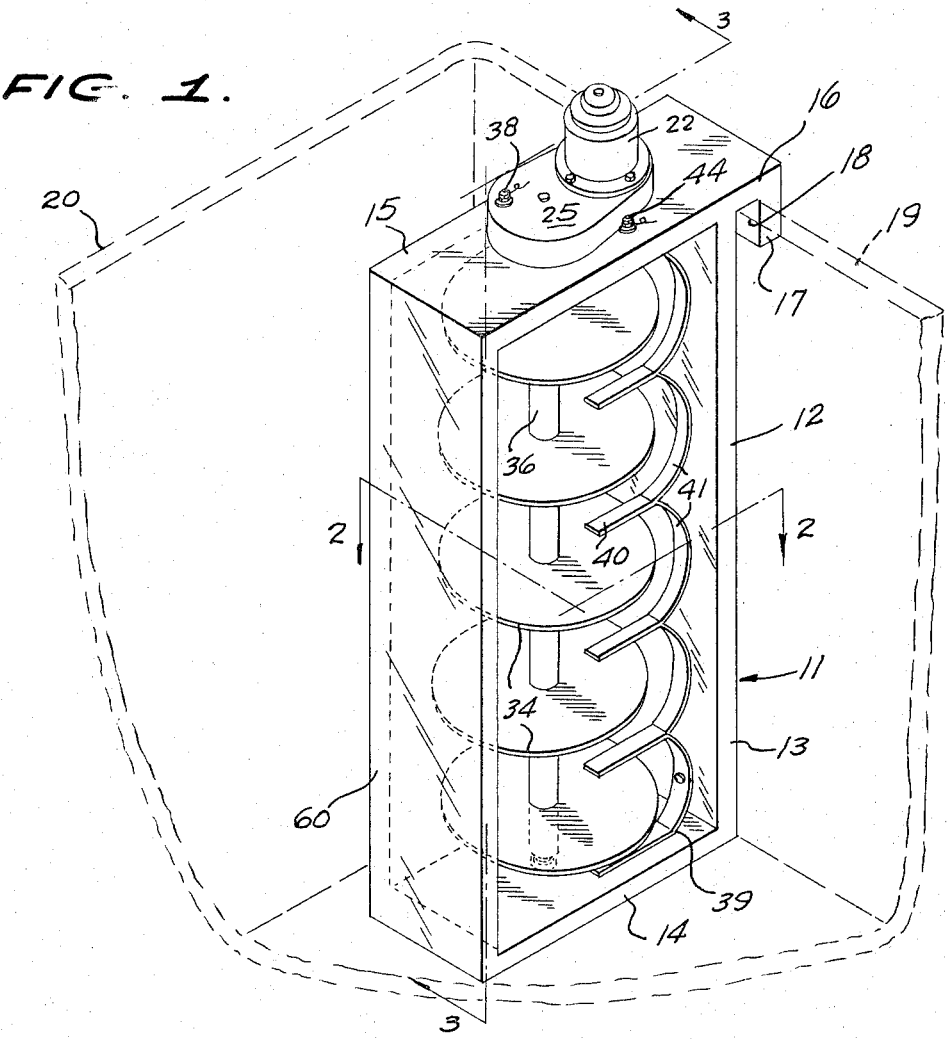
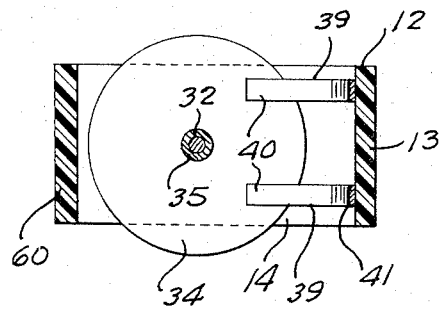
INVENTOR.
WILLIAM M. ADAMS,
BY
McMorrow, Berman & Davidson
ATTORNEYS.

INVENTOR.
WILLIAM M. ADAMS,
BY
McMorrow, Berman & Davidson
ATTORNEYS.

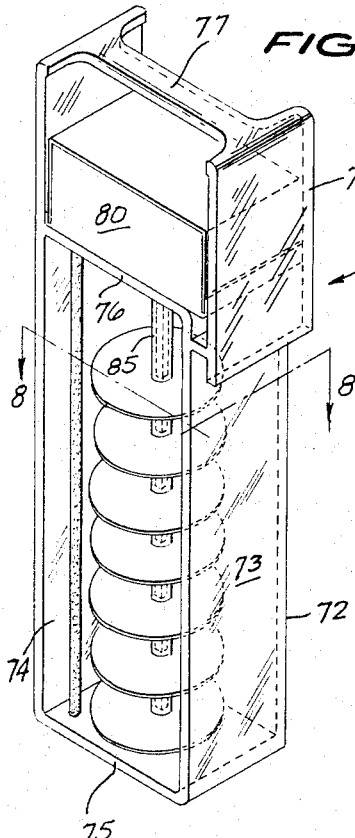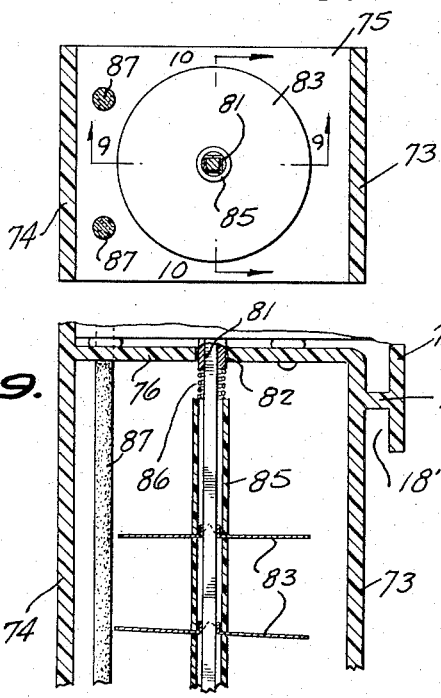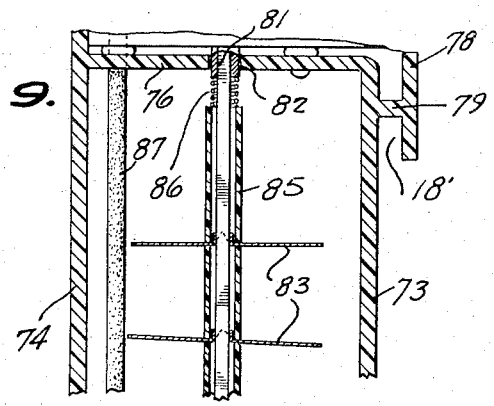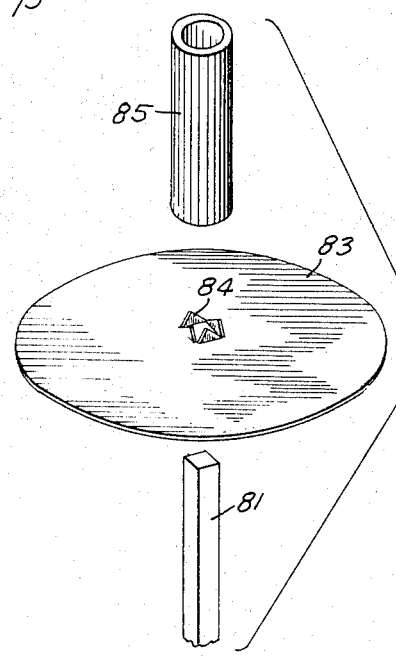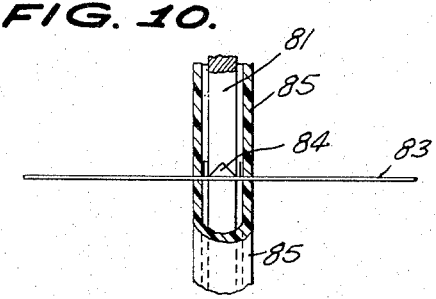

United States Patent Office  3,342,718
Patented Sept. 19, 1967

3,342,718
APPARATUS FOR THE RECOVERY OF SILVER FROM USED PHOTOGRAPHIC FIXING SOLUTIONS BY ELECTROLYSIS
William M. Adams, Santa Clara, Calif.
(3253 Oahu Ave., Honolulu, Hawaii 96822)
Filed Jan. 21, 1964, Ser. No. 339,293
2 Claims. (Cl. 204—273)

ABSTRACT OF THE DISCLOSURE

An electroplating cell having the cathode cell of multiple, tilted discs vertically oriented, supported on the bottom, driven on the top, and mounted in a frame with open sides for placement in a container; which cathode is not easily removed to prevent theft of the collected silver. The voltage is about 9 volts and the rate of rotation is about 100 r.p.m.

---

This invention relates to a system for recovering silver from used photographic fixing solutions, and more particularly to a method and apparatus for the recovery of silver from such solutions by means of electrolysis.

A main object of the invention is to provide a novel and improved method of rejuvenating photographic fixing solutions and for removing silver therefrom, whereby to prolong the life of the solution, as well as to salvage otherwise wasted silver.

A further object of the invention is to provide an improved apparatus for the recovery of silver from used photographic fixing solutions by electrolysis, the apparatus being simple in construction, being easy to install, being relatively light in weight, and providing highly efficient plating action.

A still further object of the invention is to provide an improved apparatus for the recovery of silver from photographic fixing solutions, the apparatus being inexpensive to fabricate, being portable, being arranged so that recovered silver cannot be readily stolen therefrom, and being provided with means for continuously stirring and agitating the fixing solution in which it is placed so that an adequate supply of thiosulfate ions are furnished to the cathode element thereof, whereby to permit and induce continuous plating of silver thereon.

A still further object of the invention is to provide an improved apparatus for recovering silver from photographic fixing solutions by electrolysis, the apparatus involving relatively simple parts, being arranged to provide improved uniformity in current density in adjacent portions of the solution in which it is immersed, especially at the cathode surfaces thereof, whereby to provide improved plating efficiency, the apparatus having means for securing its anode member in a substantially fixed position so that it cannot strike against the cathode member of the apparatus, and being constructed in a manner providing uniform and reliable performance with a high degree of safety.

Further objects and advantages of the invention will become apparent from the following description and claims, and from the accompanying drawings, wherein:

FIGURE 1 is a perspective view of a typical silver recovery unit constructed in accordance with the principles of the present invention, the unit being illustrated in operating position with relation to a fragmentary portion of a tank containing photographic fixing solution, said fragmentary portion being shown in dashed view.

FIGURE 2 is an enlarged horizontal cross sectional view taken substantially on the line 2—2 of FIGURE 1.

FIGURE 7 is a perspective view showing a modified form of silver recovery unit constructed in accordance with the present invention.

FIGURE 8 is an enlarged horizontal cross-sectional view taken substantially on the line 8—8 of FIGURE 7.

FIGURE 9 is a fragmentary vertical cross-sectional view taken on line 9—9 of FIGURE 8.

FIGURE 10 is an enlarged fragmentary vertical cross-sectional view taken on line 10—10 of FIGURE 8.

FIGURE 11 is a perspective view showing elements of FIGURE 10 in separated positions.

Figure 3:
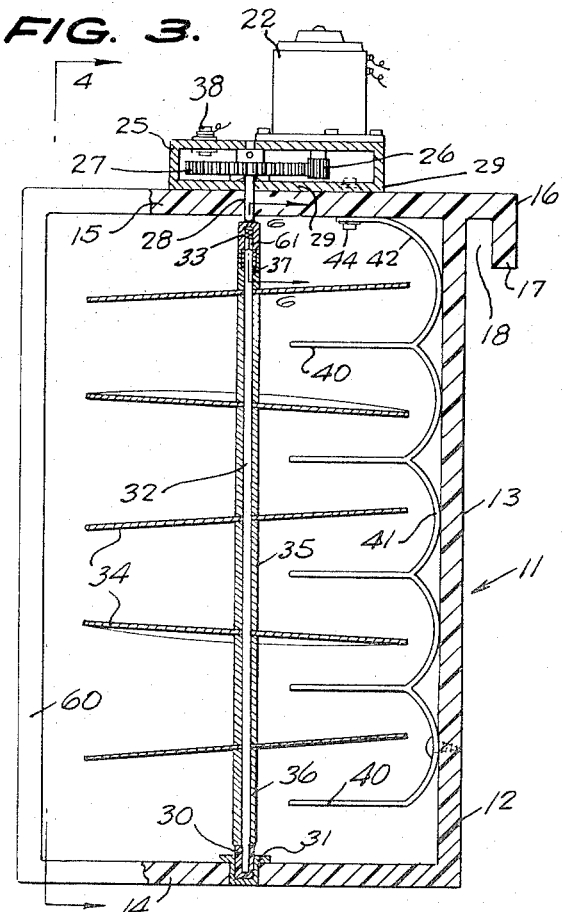
FIGURE 3 is a somewhat enlarged vertical cross sectional view taken substantially on the line 3—3 of FIGURE 1.

It is well known that the removal of the silver from a used photographic fixing solution will rejuvenate and prolong the life of the solution.

In the electrolysis of a fixing solution, for example, according to the method of the present invention, sodium and thiosulfate ions are produced from the fixing salts. The thiosulfate anions are oxidized at the anode, the silver ions remaining in the solution. The sodium cations collected electrons at the cathode to become sodium atoms and combine with ions existing at the cathode. Silver will deposit out on the cathode if the sodium combines with thiosulfate ions. If thiosulfate ions are not present to combine with the sodium, then silver sulfide will usually be predominant.

As will be readily understood by those skilled in the art, the sodium and thiosulfate ions are derived from the fixing salts, usually sodium thiosulfate ("hypo"). The silver ions come from the dissolved silver halides, washed off from the developed films by the fixing process.

Several procedures have been previously devised for collecting the silver from spent hypo solutions. One procedure is to bubble air through the solution, causing a flow past the cathode. This process does not assure that the circulating solution actually contacts the cathode. Another procedure is to pump the solution past the cathode. This method is not widely used because the corrosive hypo solution rapidly deteriorates the means for pumping. Another system previously employed involves a means to suspend a system of cathode and anode elements in the hypo, with one or the other, or both, rotating, oscillating, or otherwise vibrating. This arrangement has proven to be undesirable because of the excessive weight which must be supported by the transmission system connecting the prime mover to the electrode array. In alternate proposed electrolysis systems, rods have been employed for either the cathode or the anode array, or both. The disadvantage with such an arrangement is that the current density is highly irregular, particularly when the current flows from the rods to an object of complex shape, such as a series of plates, a stack of discs, or a wire mesh member.

A prime purpose of the present invention is to provide a system for recovering silver from used photographic solutions and for renewing and extending the useful life of fixing solutions which operates to provide thiosulfate ions continuously to the cathode. A further purpose of the present invention is to provide an arrangement which can be easily adapted for use with present tanks, and which should not require specially made heavy covers for its support.

As above mentioned, it is also a purpose of the present invention to devise an apparatus which supports the cathode in such a manner as to deter thievery of the recovered silver, along with the provision of an apparatus which is light in weight, portable, and reasonable in cost.

Referring to the drawings, 11 generally designates a typical silver recovery apparatus utilizing the method of the present invention and embodying its principles. The apparatus 11 comprises a rigid main support member 12 of durable insulating material, such as molded plastic insulating material, said support member 12 comprising a vertical main wall 13, a horizontal bottom flange 14 formed integral with the bottom edge of the main wall 13, a horizontal top flange 15 overlying and being substantially coextensive with the bottom flange 14, and a vertical inner wall 60, the top wall 15 being further formed with a rearwardly extending portion 16 having a depending vertical end lip or flange 17 spaced from and extending parallel to the top portion of the main vertical wall 12. There is thus defined between the main wall 12 and the flange 17 a downwardly facing channel or groove 18 adapted to fit over and slidably receive the top edge 19 of a vertical wall of a standard fixing tank 20, as illustrated in dotted view in FIGURE 1, whereby the main body 12 may be supported on the top edge 19 with the vertical rear wall 13 in abutment with a wall of tank 20.

Mounted on the top plate defined by the members 15, 16 is an electric motor 22 whose shaft is coupled through gearing in a gear box 25 to a shaft 28, a small gear 26 being secured on the motor shaft and meshing with a large gear 27 secured on the top end of the vertical shaft 28 which extends rotatably through the bottom wall 29 of gear box 25 and through the horizontal flange 15. The bottom end of shaft 28 rigidly carries a square socket 33 which receives the squared top end 61 of a vertical shaft 32 whose bottom end is rigidly carried in a square socket of the cup bearing 30, which is made of nylon or Teflon to minimize friction, and which is in turn supported in a flanged bottom cup, 31, also made of nylon or Teflon to further reduce friction, and secured in bottom wall 14 of the main support member 12.

Suitably supported on the vertical shaft segment 32 in vertically spaced relationship are a plurality of cathode plates or discs 34, the members 34 being centrally apertured to receive the shaft element 32 and being spaced apart by the provision of spacer sleeves 35 disposed between the adjacent discs, a bottom supporting sleeve 36 being provided between the lowermost disc and the bearing member 30, and a top sleeve 37 being provided between the top disc and the coupling member 33. The spacing sleeves are provided with sloping top ends, the discs 34 being clamped between the sloping top ends of subjacent sleeves and the similarly sloping bottom ends of the sleeves immediately above, so that the discs are held in inclined, non-horizontal positions, the angle between the planes of the discs and the horizontal varying, and being between one-half a degree and three degrees. As shown in FIGURE 3, the cathode discs or plates 34 are non-parallel and vary in inclination, being held in angled positions by being clamped between the adjacent spacing sleeves 35, and between the top and bottom spacing sleeves 36 and 37.

Figure 6:
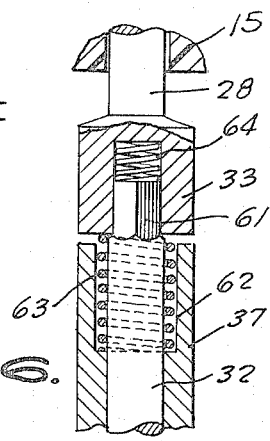
FIGURE 6 is an enlarged cross-sectional view taken substantially on line 6—6 of FIGURE 3.

As shown in FIGURE 6, the uppermost sleeve segment 37 is annularly recessed at 62 and receives a coiled spring 63 which bears between the bottom face of socket 33 and the bottom of the recess 62, exerting downward clamping force on the top sleeve 37. Another coiled spring 64 is disposed in the socket 33 above the squared stud 61 and bears between the top wall of said socket and said stud, exerting downward biasing force on shaft segment 32. This arrangement provides excellent conductivity, minimal parts, and places no load on the gear box, thereby assuring long life of the gear system.

The discs or plates 34 are made of suitable non-corrosive conductive material. The bearing cup 30 may be of any suitable non-corrosive material, such as nylon, Teflon, or the like. The use of the cup-shaped bearing member 30 and the subjacent cup-shaped flanged receiver 31, precludes easy removal of the cathode assembly, thus reducing the chances of theft of the silver deposited thereon.

The gear box 25 is preferably made of conductive material, such as metal, and is provided with an electrical terminal 38. The cathode assembly is connected to this terminal 38 through the gear box 25 and through the electrically connected shaft elements 28 and 32.

Figure 4:
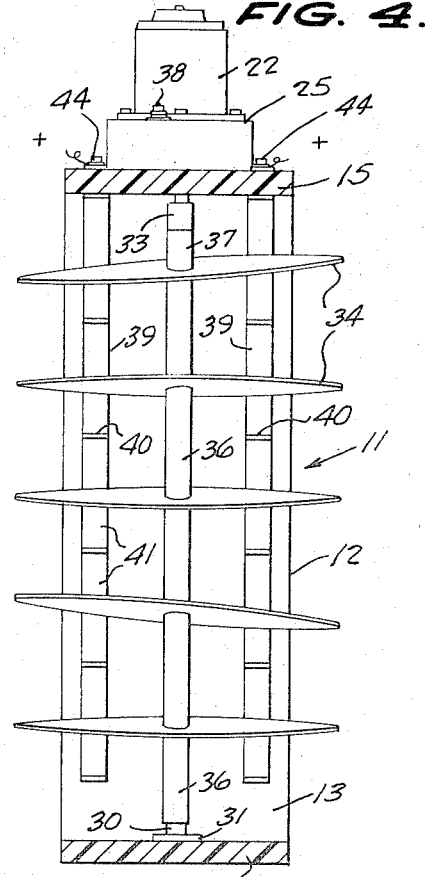
FIGURE 4 is a front elevational view taken substantially on the line 4—4 of FIGURE 3.
Figure 5:
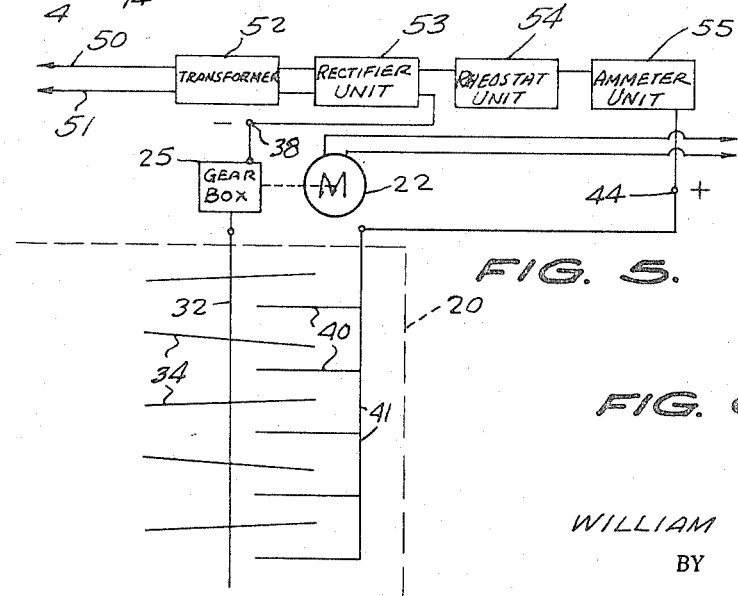
FIGURE 5 is a block electrical diagram showing in schematic form the electrical connections of an apparatus constructed in accordance with the present invention and employing the method thereof.

The apparatus 11 is provided with suitable anode means, which may comprise a pair of anode members 39 mounted vertically adjacent to and secured to the vertical wall 13 and having horizontal forwardly projecting plate elements 40 extending between respective pairs of cathode plate or disc members 34, 34. As shown in FIGURE 4, the members 39, 39 may be located symmetrically on opposite sides of the vertical central plane of the apparatus containing the shaft member 32, and the plate members 40 may be located substantially midway between adjacent pairs of vertically spaced cathode plate elements 34. The lowermost plate element 40 may extend beneath the lowermost cathode element 34, as shown in FIGURE 3. The successive horizontal plate members 40 are connected by arcuate conductive supporting members 41 which may be formed integrally with or otherwise rigidly united with the horizontal anode plate elements 40, the top member 42 of the anode assembly being secured to the top wall 15 of the main support 12, as by a terminal screw 44. It will thus be seen that each assembly 39 is supported from the top wall 15 by its terminal screw 44, and the terminal screws are preferably electrically connected together by suitable conductor means, not shown.

A uniform or fluctuating direct current voltage is applied across the cathode and anode members. Thus, the cathode terminal 38 is connected to the negative terminal of the direct current source and the anode terminal screws 44 are connected together and are connected to the positive terminal of the direct current source.

The source of direct current is entirely conventional and may be derived from a pair of alternating current supply wires 50 and 51 through a step-down transformer 52, a rectifier unit 53, a rheostat unit 54 to control the current, and an indicating ammeter assembly 55 to measure the current flowing through the electrolysis system. Any alternate means may be employed to provide the required uniform or fluctuating direct current voltage, such as a battery, or the like.

In using the apparatus 11, said apparatus is hung on the side wall of a tank of fixing bath in the manner illustrated in FIGURE 1, namely, by engaging the top edge of the wall in the groove 18, so that the portions carrying the cathode discs 34 and the anode plates 40 are submerged in the fixing solution. The steady or fluctuating direct current voltage is applied between the cathode and anode elements. The motor 22 is energized so that the cathode shaft 32 and the cathode disc members 34 rotate. The tilted discs 34 rotate and stir the solution, causing substantial homogeneous turbulence in the solution. Due to this induced mixing, there is an adequate supply of thiosulfate ions furnished to the cathode elements 34 to permit continuous plating of silver. Thus, the apparatus constitutes a means for supplying thiosulfate ions continuously to the cathode elements 34.

The substantially increased homogeneous turbulence produced by the tilted discs 34 depends upon the speed of rotation of the cathode assembly. Since the occurrence of silver sulfide depends upon the solution remaining in contact with the cathode, until an insufficient supply of thiosulfate ions occurs, by increasing the speed of rotation of the cathode discs 34 an increase in the plating current is provided, thereby producing an increase in the plating rate.

Accordingly, the silver is deposited on the cathode discs 34. By the provision of the specific bottom support illustrated, namely, employing the cup bearing member 30 and the supporting cup member 31 secured in bottom wall 14, it is not easy to remove the cathode discs 34. This tends to prevent theft of the deposited silver.

As will be apparent from FIGURE 3, the cathode discs 34 and the stationary anode plates 40 are interleaved so that the discs 34 and plates 40 present substantial surface areas to each other at all times. This arrangement provides substantially uniform current density throughout the solution and especially at the surfaces of the cathode discs. Therefore, a larger area of the cathode surfaces are brought above the critical current density at which plating begins to occur in significant amounts, for a given excitation of the apparatus. Consequently, the plating efficiency will be considerably improved, as over the devices previously employed. In addition, due to the tendency to maintain uniform current density, plating on the rims of the discs will be minimized, thus reducing any tendencies for excessive build-up of plating in this region, and avoiding any possibility of excessive build-up sufficient to cause contact with the arcuate anode plate connection elements 41.

It will be noted that the anode assemblies including the plates 40 and the connection elements 41 and 42 are secured in a substantially fixed manner to the main insulating frame 12 of the apparatus by the terminal screws 44. If so desired, additional fastening screws may be employed to secure one or more of the connection members 41 to the vertical wall 13. Because of the stationary position of the anode assemblies, there is no tendency for the anode assemblies to deflect from their intended position or to strike against the cathode plates.

It will be clearly apparent that the apparatus above described can be easily installed and removed, since the installation thereof merely requires the suspension of the apparatus on the top edge of the tank wall by engaging the top edge in the groove 18, and that the apparatus can be readily lifted out of the tank when so desired. The tilted cathode discs 34 increase the homogeneous turbulence, as over discs which are horizontal, thereby permitting an increased plating rate. Furthermore, the positive bearing support provided at the bottom end of the shaft 32 insures smooth quiet performance, as well as making it difficult to surreptitiously remove the plated discs 34, thus discouraging thievery. The intercalation of the cathode and anode elements, as above described provides substantially uniform current density, thereby permitting a higher plating rate than has been heretofore obtainable. Furthermore, by supporting the cathode and anode assemblies at both ends, increased safety of operation and uniformity of performance of the apparatus are obtained.

As will be seen from FIGURE 3, the cathode plates 34 are tilted in various different directions, and are non-parallel. Although the discs 34 rotate at a relatively slow rate, for example, within a range of from 80 to 400 r.p.m., the rate of rotation is sufficient to develop substantial reactive thrusts in the liquid, and the thrust directions for the respective plates are different because of their different inclinations and different directions of inclination. The horizontal components of these reactive thrusts are resolved into horizontal forces which would tend to deflect the cathode shaft laterally, causing the shaft to wobble and imposing bending strains thereof. This resultant horizontal thrust component is resisted by the bottom bearing assembly comprising the bearing cup 30 and its supporting housing 31, which is in turn anchored in the rigid bottom wall 14. It will therefore be apparent that it is highly advisable, if not absolutely necessary, to positively rotatably support the bottom end of the cathode shaft 32 in the manner illustrated.

Referring now to the form of the invention shown in FIGURES 7 to 11, 71 generally designates a modified form of apparatus according to the present invention, comprising a rigid main support 72 of durable insulating material having the vertical rear wall 73, the vertical front wall 74, the horizontal bottom wall 75, and the horizontal top wall 76. The vertical front wall 74 extends a substantial distance above the top wall 76 and merges integrally with one end of a horizontally extending handle member 77. The other end of the handle member 77 integrally merges with a vertical plate-like wall member 78 which extends parallel to the rear wall member 73 and is outwardly spaced therefrom, being rigidly connected thereto by an integral horizontal web member 79, as shown in FIGURE 9, thereby defining the groove 18′ therebeneath adapted to fit over and slidably receive the top edge of the vertical wall of a standard fixing tank. Thus, the main body 72 may be supported on the top edge of a vertical fixing tank with the vertical rear wall 73 in abutment with the inside surface of the tank wall, as in the previously described form of the invention.

Mounted on the top wall 76 in the space between the parallel vertical wall elements 74 and 78 is a housing 80 containing an electric drive motor and reduction gearing associated therewith, for driving a depending squared vertical shaft 81 which extends rotatably through a vertical bearing sleeve 82 provided in the central portion of top wall 76, as shown in FIGURE 9. The squared shaft 81 is suitably journaled in the bottom wall 75, for example, by the provision of a suitable bearing cup similar to that employed in the previously described form of the invention.

Engaged on the squared shaft 81 are a plurality of inclined disc members 83, each disc member being centrally formed with a square aperture to receive the squared shaft 81 and so as to be positively driven thereby, the aperture being provided at its margins with the upstanding triangular tabs 84 extending upwardly from the respective sides of the square apertures. The triangular tabs 84 make close conductive contact with the sides of the squared shaft 81, so that they serve to electrically connect the metallic plate members 83 with the metallic shaft 81. Spacer sleeves 85 of insulating material surround the shaft 81 between the disc members 83, a suitable spacer sleeve 85 being provided between the lowermost disc member 83 and the bottom wall 75, and the uppermost spacer sleeve 85 being urged downwardly by a coiled spring 86 surrounding the shaft 81 and bearing between the bottom edge of sleeve 82 and the top edge of the uppermost spacer sleeve 85, as shown in FIGURE 9. As shown in FIGURE 10, the sleeves 85 closely engage around the tabs 84 and aid in holding the tabs in close conductive surface contact with the respective sides of the squared shaft 81. As in the previously described form of the invention, the spacer sleeves 85 are provided with sloping top and bottom ends to support the disc members 83 in inclined, non-horizontal positions, the angle between the planes of the disc members and the horizontal varying in the same manner as in the previously described form of the invention.

A pair of vertical rod-like anode members 87, 87 are mounted between the top and bottom walls 76 and 75 outwardly adjacent the peripheral edges of the disc members 83, the top ends of the anode members being connected in any suitable manner to the positive terminal of the electro-plating current supply means. The top ends of the shaft 81 is similarly electrically connected to the negative terminal of said electro-plating current supply means.

The operation of the apparatus shown in FIGURES 7 to 11 is generally similar to that previously described in connection with the apparatus of FIGURES 1 to 6, the apparatus being hung on the side wall of a tank of fixing bath and being energized by means of a steady or fluctuating direct current voltage connected across the cathode and anode elements thereof, the drive motor contained in the housing 80 being energized so that the shaft 81 rotates the cathode disc members 83. The tilted disc members rotate and stir the solution causing substantial homogenous turbulence therein and operating in the same manner previously described in connection with the embodiment of FIGURES 1 to 6.

While certain specific embodiments of an improved apparatus for recovering silver from and for rejuvenating and prolonging the life of photographic fixing solutions have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An electroplating cell for recovering silver from photographic fixing solutions comprising a rigid support including a vertical main wall and parallel top and bottom horizontal walls, a hooked flange projecting rearwardly from the top corner defined between said top wall and main wall and having a depending portion extending parallel to said main wall and defining therewith a downwardly facing channel adapted to receive the top edge of the wall of a fixing solution tank, whereby to suspend the support in the tank with said main wall adjacent to the tank wall, leaving the two sides open, a vertical shaft journaled at its top and bottom ends in said top and bottom walls, a plurality of metal cathode discs secured on said shaft, a substantial number of said discs being non-perpendicular to the shaft, a cathode terminal on the support electrically connected to said discs, an anode member secured to said support and extending adjacent said plate members, an anode terminal on the support electrically connected to said anode means, means for applying a DC voltage to said terminals, and means for driving said shaft, whereby to rotate said discs in the fixing solution.

2. An electroplating cell for recovering silver from photographic fixing solutions comprising a rigid support including a vertical main wall and parallel top and bottom horizontal walls, a hooked flange projecting rearwardly from the top corner defined between said top wall and main wall and having a depending portion extending parallel to said main wall and defining therewith a downwardly facing channel adapted to receive the top edge of the wall of a fixing solution tank, whereby to suspend the support in the tank with said main wall in abutment with the wall of the tank, leaving the sides open, a vertical shaft journaled at its bottom end in said bottom wall and at its top end in a socket rigidly affixed to a driving means, a plurality of metal cathode discs secured on said shaft, a substantial number of said discs being non-perpendicular to the shaft, a cathode terminal on the support electrically connected to said discs, at least one metal anode member rigidly secured to said support and having horizontal plate-like portions extending between said discs, an anode terminal on the support electrically connected to said anode member, means for applying a DC voltage to said terminals, and means for driving said driving means, whereby to rotate said discs in the fixing solution.

References Cited

UNITED STATES PATENTS

| | | | |
|---|---|---|---|
| 567,503 | 9/1896 | Pelatan et al. | 204—273 X |
| 789,740 | 5/1905 | Johnson | 204—212 |
| 1,181,077 | 4/1916 | Holden | 204—212 X |
| 1,468,871 | 9/1923 | Anglim | 204—273 X |
| 1,535,577 | 4/1925 | Cleave | 204—10 X |
| 1,959,531 | 5/1934 | Hickman et al. | 204—5 |
| 2,810,682 | 10/1957 | Brown | 204—10 |
| 2,997,438 | 8/1961 | James et al. | 204—273 |

FOREIGN PATENTS

| | | |
|---|---|---|
| 1,022,529 | 12/1952 | France. |
| 627,713 | 8/1949 | Great Britain. |
| 134,877 | 1960 | Russia. |

JOHN H. MACK, *Primary Examiner.*

HOWARD S. WILLIAMS, *Examiner.*

W. VAN SISE, *Assistant Examiner.*